United States Patent [19]

Groves

[11] 4,236,204
[45] Nov. 25, 1980

[54] INSTRUCTION SET MODIFIER REGISTER

[75] Inventor: Stanley E. Groves, Round Rock, Tex.

[73] Assignee: Motorola, Inc., Schaumberg, Ill.

[21] Appl. No.: 885,709

[22] Filed: Mar. 13, 1978

[51] Int. Cl.³ .............................................. G06F 9/30
[52] U.S. Cl. .................................................. 364/200
[58] Field of Search ... 364/200 MS File, 900 MS File, 364/200, 900

[56] References Cited

U.S. PATENT DOCUMENTS

| | | | |
|---|---|---|---|
| 3,764,988 | 10/1973 | Onishi | 364/200 |
| 3,771,138 | 11/1973 | Celtruda et al. | 364/200 |
| 3,997,895 | 12/1976 | Cassonnet et al. | 364/200 |

*Primary Examiner*—Raulfe B. Zache
*Attorney, Agent, or Firm*—Anthony J. Sarli, Jr.

[57] ABSTRACT

An instruction set modifier register, comprising one or more bistable latches which are loadable under program control, is provided for use in a processor in conjunction with an instruction register. An instruction decoding circuit and an instruction execution control logic circuit, responsive to both the instruction register and the instruction set modifier register, generate a first set of control signal combinations corresponding to a first instruction set when the instruction set modifier register is in a first state and generate a second set of control signal combinations corresponding to a second instruction set when the instruction set modifier register is in a second state. The processor is thus able to execute more than one set of instructions, utilizing the same instruction decoding circuitry and instruction execution control logic circuitry.

18 Claims, 2 Drawing Figures

INSTRUCTION SET MODIFIER REGISTER

BACKGROUND OF THE INVENTION

This invention relates generally to a processor for a data processing system, and, in particular, to an instruction set modifier register which is loadable under program control and which permits the execution of more than one instruction set by the processor, utilizing the same instruction decoding circuitry and instruction execution control logic circuitry.

In a data processing system the basic logical and arithmetic computational operations are performed by the processor. For this purpose there is provided within the processor a number of registers and logic circuits. The processor registers are used to receive, hold, and transmit information (data and instructions) used by the processor. Several different types of registers are provided within the typical processor. For example, an accumulator register temporarily stores data and accumulates the results of logical or arithmetic operations. A program counter stores the address of the next instruction in memory to be executed. An instruction register stores the instruction code (also known as the operation code) portion of the instruction which is currently being executed by the processor, and an address register or data counter stores the operand portion of the currently executing instruction. Throughout the specification the term "instruction" will hereafter be used to refer specifically to the instruction code or operation code portion of an instruction.

To enable the processor to perform all of the intended arithmetic and logic operations which are desired to be performed, the processor is provided with the capability of executing a repertory of individual instructions collectively known as an instruction set. Individual instructions are executed by the processor to perform such operations as loading information into a register, transferring information between registers or between registers and memory, comparing the contents of two registers, and so forth. Such instructions may be thought of as "macroinstructions" since the execution of one such instruction by the processor comprises a number of sub-operations or "microinstructions" by the circuitry making up the instruction execution control logic portion of the processor. During the execution of a single instruction many different logic gates in the instruction execution control logic circuitry may be opened and closed in a precise sequence in order to implement the particular macro-operation called for by the instruction. The opening or closing of each gate may be individually viewed as a single microinstruction.

It is very useful for a processor to have the capability of executing an instruction set for a different computer in addition to its own instruction set. Normally the processor is endowed with a unique instruction set comprising a plurality of individual operation code words, each of which comprises a distinctive combination of 1's and 0's, in response to which the instruction decoding circuitry and instruction execution control circuitry perform all of the individual microinstructions necessary to carry out the particular instruction. A known prior art emulation technique, referred to as microprogramming, allows a processor to execute instruction sets from several different computers. For example, the IBM System/360 and System/370, as well as other known computer systems, utilize a special program called a "microprogram" to execute a plurality of individual microinstructions which together comprise a basic macroinstruction. In response to a given macroinstruction, a special processor memory known as a control store is accessed and a microprogram corresponding to the macroinstruction is executed, with each of the individual microinstructions serving to control the desired operation of the instruction execution control logic circuitry. In this manner, an IBM 1401, for example, can have its instructions emulated on an IBM System/360 or System/370.

It will be appreciated that the capability of a processor to emulate another processor by executing the instruction set of the other processor adds a great deal of flexibility and versatility to a computer system, which can result ultimately in substantial savings to the user of such system.

The advantages to the user of a data processing system having emulation capabilities include the ability to execute software written for more than one type of computer system thereby avoiding the necessity of expensive and time-consuming software conversion efforts.

While the technique of microprogramming has been utilized in a number of mainframe and minicomputer systems, it does not lend itself well to microcomputer systems, where the space necessary for a control store is difficult to justify on the limited silicon area of a large-scale-integrated (LSI) circuit device. There is therefore a need for a mechanism in a processor permitting the processor to execute two or more instruction sets without requiring the extensive consumption of silicon space in an LSI circuit device.

SUMMARY OF THE INVENTION

Accordingly, it is an object of the present invention to provide a processor with the capability of executing more than one instruction set.

It is also an object of the present invention to provide in a processor an instruction set modifier register which is loadable under program control and whose contents are determinative of which of a plurality of instruction sets is to be used by the processor instruction decoding circuitry in executing a given instruction.

It is a further object of the present invention to provide an integrated circuit microprocessor with means for executing two or more different instruction sets, which means utilizes a minimum amount of semiconductor silicon area.

These and other objects are achieved in accordance with a preferred embodiment of the invention by providing within a processor a data bus, a plurality of registers and logic circuits, including an instruction register coupled to the data bus for temporarily storing individual instructions from two or more instruction sets, an instruction decoding and control circuit responsive to the instruction register for decoding the contents of the instruction register and having a plurality of control lines for controlling the operation of the plurality of registers and logic circuits in accordance with the instructions, and an instruction set modifier register having a plurality of states each corresponding to one of the instruction sets, the instruction decoding and control circuit being responsive to the instruction set modifier register for activating the same ones of the plurality of control lines when any one of a plurality of different instruction words, each from a different instruction set and representing an instruction which is common to each of the instruction sets, is stored in the instruction register, provided that the state of the instruction set modifier register corresponds to that instruction set containing such any one instruction word.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
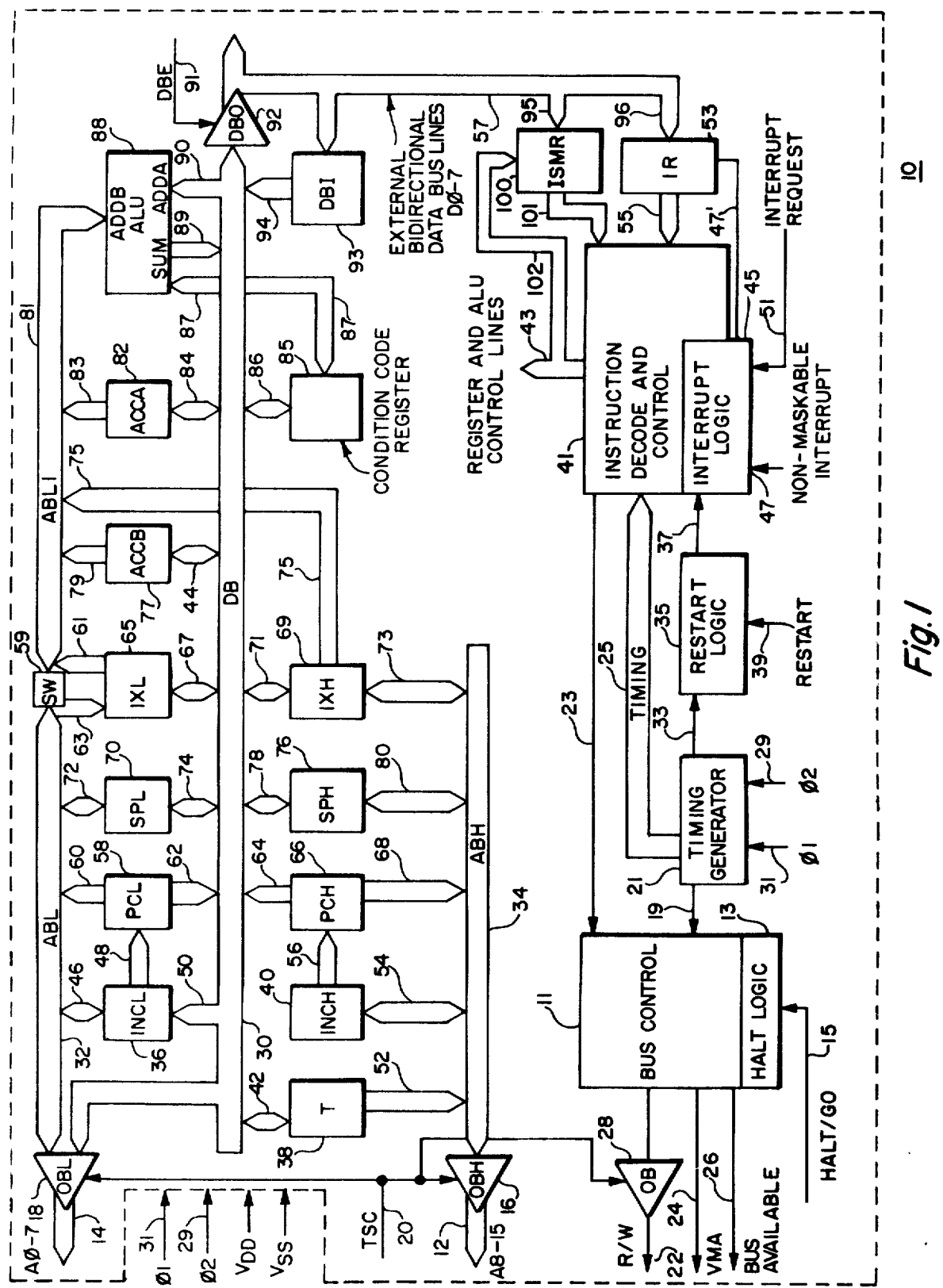
FIG. 1 is a block diagram of a preferred embodiment of the invention and includes the internal bus structure, programmable registers, and logic blocks.

With reference to FIG. 1, a block diagram of a processor, including the internal bus structure, programmable registers, and logic blocks, is shown. The block diagram of FIG. 1 represents a modification of the architecture of the Motorola 6800 microprocessor in accordance with the teachings of the present invention. For a complete description of the Motorola 6800 microprocessor reference may be had to U.S. Pat. No. 4,037,204, filed Sept. 17, 1975, entitled "Microprocessor Interrupt Logic", by Thomas H. Bennett et al, assigned to the assignee of the present invention, and to the related patents and patent applications referenced therein.

The block diagram of FIG. 1 is described in detail in the above-referenced U.S. Pat. No. 4,037,204. However, it will be worthwhile here to discuss the principal elements of FIG. 1 as they relate to the present invention. A number of control function blocks are shown in FIG. 1, including bus control circuit 11, halt logic 13, timing generator 21, restart logic 35, instruction decode and control circuit 41, and interrupt logic circuitry 45. The microprocessor architecture depicted in FIG. 1 represents the basic functional connections between the registers, counters, arithmetic logic unit (ALU), control function blocks, internal address busses, and internal data busses.

The microprocessor device 10 shown in FIG. 1 has four 16-bit registers and four 8-bit registers available for use by the programmer. The program counter PCL, PCH indicated by reference numerals 58 and 66, respectively, is a two-byte register which points to the current program address. Its contents are updated after execution of an instruction. The incrementor register INC, which includes INCL 36 and INCH 40, updates the current program address during the execution of a current instruction by incrementing or decrementing its current contents. It may load its contents into the program counter independently of the address bus and may function as an auxiliary register or as an up-down counter or incrementor/decrementor of other registers connected to the address bus or data bus. The stack pointer SP includes SPL 70 and SPH 76 and is a two-byte register that contains the address of the next available location in an external push-down/pop-up stack.

The temporary register T 38 is used for temporary storage and may store the higher order address bits. The index register IX includes IXL 65 and IXH 69 and is a two-byte register used to store a 16-bit memory address in the indexed mode of memory addressing.

Two 8-bit accumulators ACCA 82 and ACCB 77 are used to hold operands and results from the ALU 88. The condition code register 85 indicates six condition flags: Negative Number, Zero, Overflow, Carry from Bit 7, Carry from Bit 3, and Interrupt Mask. These six bits of the condition code register are used as testable conditions for conditional branch instructions. The condition code register 85 also contains two unassigned bits.

With specific reference now to the instruction register IR 53, instruction set modifier register ISMR 100, and instruction decode and control circuit 41, the features unique to the present invention will be described. Instruction register IR 53 is an 8-bit register which latches up and holds information in the form of individual instructions applied to it from data bus 57. Instruction decode and control circuit 41 generates a plurality of control signals over a plurality of conductors shown generally as control signal bus 43, which conductors are understood to be dispersed throughout the processor to the registers, ALU circuitry, busses, control function blocks, and the various coupling and buffer circuits associated therewith in order to control in proper sequence the necessary information transfers during execution of a given instruction held within instruction register IR 53. Reference may be had to the aforementioned U.S. Pat. No. 4,037,204, and in particular to FIGS. 3A-3N, 3P-3Z, 3AA-3NN, and 3PP-3TT for the specific interconnections between the instruction decode and control circuit 41 and the various processor elements controlled, with the exception of the interconnections between the instruction decoding control circuit 41 and the instruction set modifier register ISMR 100. The latter specific interconnections are discussed hereinafter with respect to FIG. 2.

Still with reference to FIG. 1, it will be seen that the instruction set modifier register ISMR 100 may receive information over data bus 57 via branch 95 thereof. Such information serves to load ISMR 100 with a binary number representing a particular instruction set. For each unique number stored in ISMR 100 it is possible for the instruction decode and control circuit 41 to interpret a given instruction stored in instruction register IR 53 as a member of a different instruction set. In its simplest form, ISMR 100 may be a 1-bit flip-flop, one state of which indicates that instructions received and stored by instruction register IR 53 are to be interpreted as belonging to a first instruction set and the other state of which indicates that instructions received are to be interpreted as belonging to a second instruction set.

The particular state of which ISMR 100 is set is transmitted as a signal over bus 101 to instruction decode and control circuit 41. In turn, ISMR 100 may receive control signals from instruction decode and control circuit 41 over bus 102.

Figure 2:
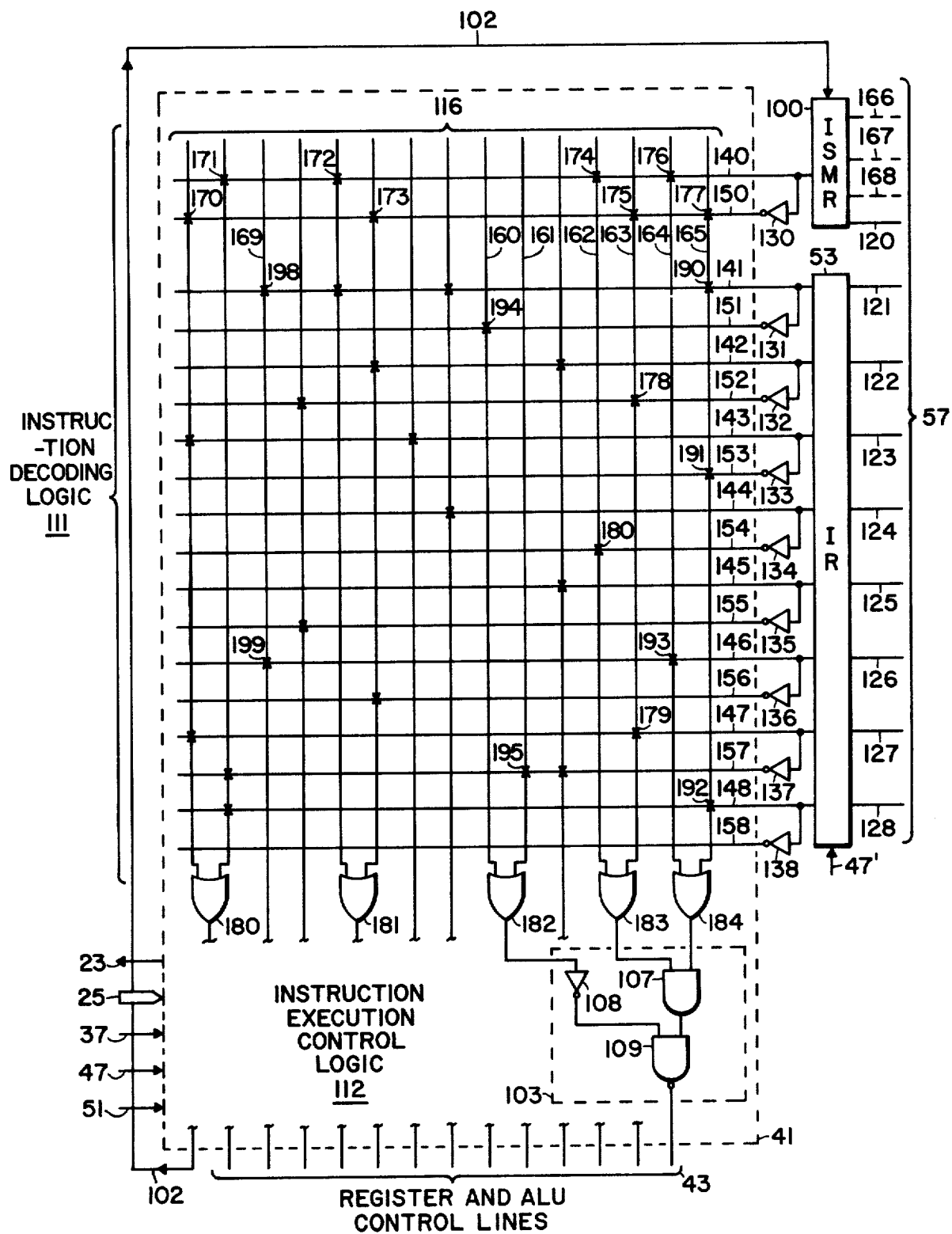
FIG. 2 shows a detailed logic diagram of a portion of the block diagram shown in FIG. 1.

With reference now to FIG. 2 the structure and operation of the instruction set modifier register ISMR 100 as it relates to the instruction register IR 53 and the instruction decode and control circuit 41 will now be described. Instruction decode and control circuit 41 is shown in dashed outline in FIG. 2 and comprises instruction decoding logic 111 and instruction execution control logic 112. A plurality of register and ALU control lines 43, 102, and 23, two sets of IR output lines 141-148 and 151-158, a pair of ISMR output lines 140 and 150, a timing signal bus 25, a restart logic control line 37, a non-maskable interrupt (NMI) line 47, and an interrupt request (IRQ) line 51 interface the instruction decode and control circuit 41 to the other processor elements.

Within the instruction decoding logic 111 a plurality of decoding lines 116 intersect the ISMR output lines 140 and 150 and the IR output lines 141-148 and 151-158 and lead into logic circuitry within the instruction execution control logic 112, which logic circuitry generates a sequene of outputs over register and ALU control lines 43, 23, and 102 to control the operation of the various registers and other control circuitry within the processor in response to the contents of the IR and ISMR. Decoding lines 116 are connected to lines 140-148 and 150-158 at the locations, for example, shown by X's in FIG. 2, each representing a transistor which is rendered conductive by the application of a binary 1 signal over one of lines 140-148 or 150-158 to its gate electrode and which is rendered nonconductive when a binary 0 signal is applied to its gate electrode.

A representative portion of the instruction execution control logic circuitry 112 of instruction decode and control circuit 41 is shown is dashed outline 103 and comprises AND gate 107, inverter 108, and NAND gate 109. It should be understood that logic circuit portion 103 is shown for illustrative purposes only and that the instruction execution control logic circuitry of a typical processor instruction decode and control circuit will typically have many more logic gates between the instruction decoding logic 111 and the output of instruction decode and control circuit 41. Reference may be had, for example, to the aforementioned U.S. Pat. No. 4,037,204 (FIG. 3) for a disclosure of a typical instruction decode and control circuit.

IR 53 is implemented in the form of an plurality of bistable latches or flip-flops, one for each bit of an instruction word received over input lines 121-128. IR 53 receives as control inputs thereto an interrupt response signal over line 47' as well as control signals from instruction decode and control circuit 41 over lines not shown. In response to the binary value received over each of IR input lines 121-128, IR 53 generates a corresponding binary value over output lines 141-148 and the complement of such value over lines 151-158, the complement being produced by inverters 131-138.

ISMR 100 may also be implemented as one or more bistable latches or flip-flops. Only one such flip-flop is required to provide the capability of executing one additional instruction set. However, the capability of executing a third and fourth instruction set can readily be provided by using an additional flip-flop, and so forth. In response to a binary signal received over ISMR input line 120, ISMR 100 generates a signal having the same binary value over line 140 and the complement of such signal over line 150 after inversion by inverter 130. The dashed line inputs 166-168 to ISMR 100 represent additional possible input lines, each giving the capability of executing twice as many additional instruction sets. Thus N input lines allow $2^N$ instruction sets to be executed.

The operation of a preferred embodiment of the invention will now be described with reference to FIG. 2. The output lines 141-148 and 151-158 of IR 53 are connected to various ones of decoding lines 116, as mentioned earlier, to provide the desired decoding of any instruction within a given given instruction set. By way of example, assume for the moment that ISMR 100 is in a first state representing a first instruction set to be executed, in response to, for example, a binary 0 input over line 120, and that IR 53 is storing a given 8-bit instruction word 11011001 (line 128 inputs the most significant bit and line 121 inputs the least significant bit). Because ISMR 100 is assumed to be storing a 0, line 140 is low and line 150 is high. The high output over line 150 of ISMR 100 turns on transistors 170, 173, 175, and 177 whose control gates are responsive to the high signal on line 150. Because IR 53 is assumed to be holding instruction word 11011001, lines 141, 152, 153, 144, 145, 156, 147, and 148 are all high, whereas the remaining outputs from IR 53 are low. The transistors whose control gates are coupled to those lines of IR 53 which are in a high state are turned on, whereas those transistors whose control gates are coupled to those lines in a low state remain turned off. Conductive paths are formed along particular ones of decoding lines 116 to the instruction execution control logic 112, provided that all of the connecting transistors along such lines have been enabled by an appropriate combination of high level outputs from IR 53. For example, a conductive path is formed along line 163, since transistors 175, 178, and 179 are all turned on. OR gate 183 accordingly generates a high input into AND gate 107. Similarly, line 165 is rendered conductive, since transistor 177, 190, 191, and 192 are all turned on, so that OR gate 184 generates a high input into AND gate 107. AND gate 107 accordingly generates a high input into NAND gate 109. Since neither transistor 194 or 195 on lines 160 and 161, respectively, is turned on, OR gate 182 generates a low input to inverter 108, which in turn generates a high input to NAND gate 109. NAND gate 109 thus generates a low output from the instruction word 11011001 of the first instruction set.

If it is desired to achieve the same logical output from the represented portion 103 of the instruction execution control logic circuit 112, using an altogether different instruction word from a second instruction set, the state of ISMR is switched to a logical "1" so that output line 140 is high and line 150 is low. Assuming that 01110001 is the instruction word in the second instruction set which corresponds to instruction word 11011001 in the first instruction set, appropriate connecting transistors are provided along lines 160, 162, and 164, which serve as alternate inputs into OR gates 182-184, respectively, in order to generate the identical logical result at the output of logic circuit portion 103 for both instruction words. Line 164 goes high since transistors 176 and 193 are turned on, and consequently OR gate 184 is also turned on, transmitting a high level input into AND gate 107. Line 162 also becomes conductive when transistors 174 and 180 are turned on, so that OR gate 183 transmits a high level input into AND gate 107. Consequently AND gate 107 is turned on and generates a high level signal to NAND gate 109. Line 160 does not become conductive, since neither transistor 194 nor transistor 195 is enabled for this particular instruction word. As a result, OR gate 182 generates a low level input to inverter 108, which generates a high level input to NAND gate 109. NAND gate 109 thus generates a low level output, since both its inputs are high. Thus the ultimate output of logic circuit segment 103 is the same when instruction word 11011001 of the first instruction set or instruction word 01110001 of the second instruction set is present in IR 53. To ensure that identical results from each of the other logic circuit portions (not shown) of instruction execution control logic circuit 112 are achieved for these two different instruction words, appropriate connections are made between decoding lines 116 and lines 140-148 and 150-158 from ISMR 100 and IR 53 in a manner analogous to that just described with reference to logic portion 103.

An OR gate 180-184 is provided for each input into the instruction execution control logic 112 for which it is desired to generate the identical control signal sequence over register and ALU control lines 23, 102, and 43 for different instruction words from different instruction sets. To the input of each such OR gate is connected a separate decoding line corresponding to each different instruction set, the instructions of which one wishes to execute. In the example shown in FIG. 2 two different sets may be executed, depending upon the logical state of ISMR output lines 140 and 150. Accordingly, there are two decoding lines input to each OR gate 180-184. If it were desired to execute four different instruction sets, then a maximum of four decoding lines 116 would be input into each OR gate 180-184. It should be understood that an OR gate need not be provided for every decoding line into instruction execution and control logic 112, since for certain instructions from two or more instruction sets several bit positions may be shared in common, and those portions of instruction execution control logic 112 whose operation is initiated by binary 1's in such bits will be made operative whenever binary 1's are present in such bit positions, whether in an instruction word from one instruction set or in an instruction word from another instruction set. For example, line 169 will become conductive whenever a binary 1 is received over lines 121 and 126 as inputs to IR 53. Since it is desired that line 169 become conductive whenever transistors 198 and 199 are turned on, regardless of the states of the remaining bits in the instruction word, there is no need to provide an OR gate between the instruction decoding logic 111 and the instruction execution control logic 112 or to provide an alternative decoding line to such OR gate.

ISMR 100 may have its contents altered, indicating a different instruction set is to be executed, either by an appropriate signal transmitted over control line 102 from instruction execution control logic 112, in response to an appropriate instruction loaded into IR 53, or directly from data bus 57, as a result of a memory access, for example, again under program control in response to a given instruction in IR 53. Alternatively, ISMR 100 may be loaded by any appropriate alternative means, such as a console switch.

It will be apparent to those skilled in the art that the disclosed Instruction Set Modifier Register may be modified in numerous ways and may assume many embodiments other than the preferred form specifically set out and described above. Accordingly, it is intended by the appended claims to cover all modification of the invention which fall within the true spirit and scope of the invention.

What is claimed is:

1. In a processor comprising a data bus, a plurality of registers and logic circuits, including an instruction register coupled to said data bus for temporarily storing an individual one of a plurality of instructions from two or more instruction sets, and an instruction decoding and control circuit responsive to said instruction register for decoding the contents of said instruction register and having a plurality of control lines for controlling the operation of said plurality of registers and logic circuits in accordance with said instructions, said processor further comprising:
an instruction set modifier register having a plurality of states each corresponding to one of said instruction sets, said instruction decoding and control circuit being responsive to said instruction set modifier register for activating the same ones of said plurality of control lines when any one of a plurality of different instruction words, each from a different instruction set and representing an instruction which is common to each of said instruction sets, is stored in said instruction register, provided that the state of said instruction set modifier register corresponds to that instruction set containing said any one instruction word.

2. The processor recited in claim 1 wherein said instruction set modifier register is coupled to said data bus and to one of said control lines.

3. The processor recited in claim 1 wherein said instruction set modifier register comprises at least one bistable logic means.

4. In a processor comprising a data bus for transmitting and receiving data, a plurality of registers and logic circuits including an instruction register coupled to said data bus for temporarily storing an individual one of a plurality of instructions from two or more instruction sets, said instruction sets sharing in common at least one instruction representing an operation to be performed by said processor, said at least one instruction being represented by a different instruction word in each of said instruction sets, and an instruction decoding and control circuit responsive to said instruction register for decoding the contents of said instruction register and having a pluality of control lines for controlling the operation of said plurality of registers and logic circuits in accordance with said instructions, said processor further comprising:
an instruction set modifier register having a plurality of states each corresponding to one of said instruction sets, said instruction decoding and control circuit being responsive to said instruction set modifier register for activating the same ones of said plurality of control lines when any one of said instruction words representing said at least one instruction is stored in said instruction register, provided the state of said instruction set modifier register corresponds to that instruction set containing said any one instruction word.

5. The processor recited in claim 4 wherein said instruction set modifier register is coupled to said data bus and to one of said control lines.

6. The processor recited in claim 4 wherein said instruction set modifier register comprises at least one bistable logic means.

7. The processor recited in claim 4 wherein said instruction decoding and control circuit comprises:
instruction decoding logic comprising a first plurality of conductors responsive to said instruction register, a second plurality of conductors intersecting said first plurality of conductors, first means responsive to the receipt of a first set of binary signals on said first plurality of conductors for causing a first group of binary signals to be generated over said second plurality of conductors,
a third plurality of conductors intersecting said first plurality of conductors, second means responsive to the receipt of a second set of binary signals on said first plurality of conductors for causing a second group of binary signals to be generated over said third plurality of conductors, and instruction execution control logic responsive to said second and third plurality of conductors for activating said ones of said plurality of control lines.

8. In a processor comprising a data bus for transmitting and receiving data, a plurality of registers and logic circuits including an instruction register coupled to said data bus for temporarily storing an instruction representing an operation to be performed by said processor, and an instruction decoding and control circuit responsive to said instruction register for decoding the contents of said instruction register and having a plurality of control lines for controlling the operation of said plurality of registers and logic circuits in accordance with said instruction, said processor further comprising:

an instruction set modifier register having at least a first state and a second state each corresponding to a different instruction set, said instruction decoding and control circuit being responsive to said instruction set modifier register for generating a first set of control signals over said control lines in response to said first state of said instruction set modifier register and the storing of said instruction in said instruction register and generating a second set of control signals over said control lines in response to said second state of said instruction set modifier register and the storing of said instruction in said instruction register, said instruction set modifier register being coupled to said data bus and to one of said control lines, the state of said instruction set modifier register being set in accordance with the execution of a predetermined instruction by said processor.

9. The processor recited in claim 8 wherein said instruction set modifier register comprises at least one bistable logic means.

10. A processor comprising:
a data bus for transmitting and receiving data,
a plurality of registers and logic circuits including an instruction register coupled to said data bus for temporarily storing an individual one of a plurality of instructions from two or more instruction sets, said instruction sets sharing in common at least one instruction representing an operation to be performed by said processor, said at least one instruction being represented by a different instruction word in each of said instruction sets, said instruction register generating a first set of binary signals in response to storing a first instruction word representation of said at least one instruction and generating a second set of binary signals in response to storing a second instruction word representation of said at least one instruction,
an instruction set modifier register having a plurality of states each corresponding to one of said instruction sets, said instruction set modifier register generating a third set of binary signals representing a first one of said plurality of states and generating a fourth set of binary signals representing a second one of said plurality of states,
instruction decoding logic comprising a first plurality of conductors responsive to said instruction register, a second plurality of conductors responsive to said instruction set modifier register, a third plurality of conductors intersecting said first and second plurality of conductors, a fourth plurality of conductors associated with selected ones of said third plurality of conductors and intersecting said first and second plurality of conductors, first means responsive to said first and third sets of binary signals for generating a first group of binary signals over said third plurality of conductors, second means responsive to said second and fourth sets of binary signals for generating a second group of binary signals over said fourth plurality of conductors, and
instruction execution control logic having a plurality of control lines and controlling the operation of said plurality of registers and logic circuit by activating selecting ones of said control lines, said instruction execution control logic being responsive to said third and fourth plurality of conductors and comprising means for activating the same ones of said control lines in response to either of said first or second group of signals.

11. The processor recited in claim 10 wherein said means for activating comprises a plurality of OR-type logic gates.

12. The processor recited in claim 10 wherein said instruction set modifier register is coupled to said data bus and to one of said control lines and wherein the state of said instruction set modifier register is set in accordance with the execution of a predetermined instruction by said processor.

13. The processor recited in claim 10 wherein said instruction set modifier register comprises at least one bistable logic means.

14. A processor comprising
a data bus for transmitting and receiving data,
a plurality of registers and logic circuits including
an instruction register coupled to said data bus for temporarily storing an individual instruction from one of a plurality of instructions from two or more instruction sets, said instruction representing an operation to be performed by said processor,
an instruction decoding circuit responsive to said instruction register for decoding the contents of said instruction register, said instruction decoding circuit comprising at least a first set and a second set of decoding lines each corresponding to a different instruction set,
an instruction set modifier register having at least a first state and a second state each corresponding to a different instruction set, said instruction decoding circuit being responsive to said instruction set modifier register for generating a first set of decoded signals over said first set of decoding lines in response to said first state of said instruction set modifier register and the storing of said instruction in said instruction register and generating a second set of decoded signals over said second set of decoding lines in response to said second state of said instruction set modifier register and the storing of said instruction in said instruction register,
a plurality of logic means, each individually responsive to one of said first set of decoding lines and one of said second set of decoding lines and each generating a control input signal in response to a decoded signal received over either of said decoding lines, and
a control circuit responsive to the control input signals generated by said plurality of logic means and having a plurality of control lines for controlling the operation of said plurality of registers and logic circuits in accordance with said instruction.

15. The processor recited in claim 14 wherein said logic means comprise OR-type logic gates.

16. The processor recited in claim 14 wherein said instruction decoding circuit comprises additional decoding lines, and wherein said control circuit is also responsive to said additional decoding lines.

17. The processor recited in claim 14 wherein said instruction set modifier register comprises at least one bistable logic means.

18. The processor recited in claim 14 wherein said instruction set modifier register is coupled to said data bus and to one of said control lines and wherein the state of said instruction set modifier register is set in accordance with the execution of a predetermined instruction by said processor.

* * * * *